United States Patent [19]
Rabanne et al.

[11] Patent Number: 6,084,517
[45] Date of Patent: Jul. 4, 2000

[54] SYSTEM FOR TRACKING POSSESSIONS

[76] Inventors: Michael C. Rabanne, 236 Sun Arbor Ter. #1116, Salt Lake City, Utah 84116; Steven D. Ivie, 4297 S. 6220 West, West Valley City, Utah 84128

[21] Appl. No.: 09/132,916

[22] Filed: Aug. 12, 1998

[51] Int. Cl.[7] .................................................. G08B 23/00
[52] U.S. Cl. ...................................... 340/573.4; 340/691.3
[58] Field of Search ............................. 340/573.4, 572.1, 340/568.1, 539, 571, 691.3

[56] References Cited

U.S. PATENT DOCUMENTS

| | | | |
|---|---|---|---|
| 4,399,431 | 8/1983 | Satomi et al. | 340/568.1 X |
| 5,028,909 | 7/1991 | Miller | 340/568.6 |
| 5,204,657 | 4/1993 | Prosser et al. | 340/571 |
| 5,289,163 | 2/1994 | Perez et al. | 340/539 |
| 5,552,773 | 9/1996 | Kuhnert | 340/691.3 X |
| 5,565,848 | 10/1996 | Leyden et al. | 340/568.2 |
| 5,608,378 | 3/1997 | McLean et al. | 340/568.1 |
| 5,621,388 | 4/1997 | Sherburne et al. | 340/573.4 |
| 5,629,677 | 5/1997 | Staino, Jr. | 340/568.1 |
| 5,642,095 | 6/1997 | Cook | 340/568.7 |
| 5,646,593 | 7/1997 | Hughes et al. | 340/573.1 |
| 5,652,570 | 7/1997 | Lepkofker | 340/573.4 |
| 5,661,460 | 8/1997 | Sallen et al. | 340/573.4 |
| 5,677,673 | 10/1997 | Kipnis | 340/571 X |
| 5,677,675 | 10/1997 | Taylor et al. | 340/571 |
| 5,680,105 | 10/1997 | Hedrick | 340/571 |
| 5,686,891 | 11/1997 | Sacca et al. | 340/571 |
| 5,689,238 | 11/1997 | Cannon, Jr. et al. | 340/572.1 |
| 5,771,002 | 6/1998 | Creek et al. | 340/539 |

*Primary Examiner*—Thomas Mullen
*Attorney, Agent, or Firm*—Morriss, Bateman, O'Bryant & Compagni

[57] ABSTRACT

A system for selectively detecting the presence of a plurality of objects in proximity to a person. The system includes a plurality of child units each having a first communicating device (such as a transceiver) for sending a locator signal and for receiving a control signal. Further, the system includes a parent unit having a second communicating device for receiving the locator signal from at least one of the plurality of child units, a processor for monitoring the at least one child unit and for determining whether the child unit is within a preselected range, at least one alarm for signaling the person when the selected child unit is outside the preselected range, and controls for selectively controlling the child units to be monitored and for controlling activation of the child units.

29 Claims, 7 Drawing Sheets

SYSTEM FOR TRACKING POSSESSIONS

BACKGROUND OF THE INVENTION

1. The Field of the Invention

This invention relates generally to electrical devices for tracking items in the possession of a person, and more particularly to a system in which a first electrical device can selectively communicate with at least one other electrical device and can indicate a presence and/or location of the other device.

2. The Background Art

Various devices are known in the art for monitoring or locating objects that are commonly found in possession of a person. For example, in U.S. Pat. No. 5,680,105 a lost object locator includes activation units that are mounted on a rack and response units that are attached to objects that are commonly misplaced such as car keys. Each of the activation units corresponds to a single response unit and when one of the objects that has a response unit attached thereto is lost or misplaced, the corresponding activation unit can be activated to send a signal to the response unit on the lost object. When the response unit attached to the lost object receives the signal from the activation unit, an audible tone is emitted from the response unit which, ideally, will indicate the location of the lost object to the person activating the activation unit. The invention also provides for mobile activation units that can be placed in areas that the person believes are nearer the lost object so that the audible tone can be easily detected by the person when the response unit is activated by the activating unit. Undesirably, however, an activation unit is required for each object that is to be located and the activation unit provides only a single function for locating the lost object. Further, although the lost object locator provides for a master activation unit that can be detached from the rack when a person is looking for lost objects, the master activation unit suffers from a lack of programmability and individual control for interacting with objects. For example, the master activation unit is incapable of selectively activating individual response units. Finally, the response units are incapable of locating a lost or misplaced activation unit.

Another device for monitoring or locating objects is the child proximity detector disclosed in U.S. Pat. No. 5,646,593. The child proximity detector includes a parent unit that receives pulse signals on a regular interval from a child unit. When the parent unit fails to receive a signal from the child unit, an alarm condition is established in the parent unit. Because these detectors can be "fooled" by causing a parent unit to fail to reach an alarm state when the child unit is out of range, those skilled in the art have developed parent and child units that communicate with each other. However, even these improved "intelligent" units suffer from the disadvantage of having limited functionality because a person cannot dynamically modify a parent unit to implement individual control over a single child unit, e.g., the units can not be programmed to selectively activate a single child unit. Furthermore, the child unit cannot be used to locate the parent unit.

Yet another device of the prior art disclosed in U.S. Pat. No. 5,621,388 provides the function of a child proximity detector by monitoring a person, or persons, to determine if they have moved, or been moved, further than a preselected distance from a base station. Although this device provides dual functionality in the parent device of both monitoring and locating a person wearing a remote (i.e., child) device, the device has drawbacks for use as a possession tracker because it does not offer more than two functions One drawback of only having dual functionality is that the system will not operate in a locating mode unless the remote device is located outside the preselected distance set in the parent device. The prior art device also lacks the ability to selectively activate remote devices with the parent device In addition, this prior art device does not have the capability to automatically detect when it should shut down to avoid interfering with other signals, e.g., when it is near a transponder on a commercial airline during take off. Further, the remote device will not operate in a manner to locate the parent device.

In view of the foregoing, it would be advantageous to provide a system having a local (i.e., parent) device that can be selectively programmed by a person to track one or more remote (i.e., child) devices, wherein the remote device can also operate to locate the local device, and wherein the system will automatically detect when communication signals between the devices should not occur and thus shut down communications.

OBJECTS AND SUMMARY OF THE INVENTION

It is an object of the present invention to provide a system for monitoring when a selected object is no longer within a preselected distance of a person.

It is a primary object of the present invention to provide a system for locating a selected object that has been misplaced It is another object of the invention to provide such a system for automatically detecting when communication signals between the electrical devices of the invention should cease due to interference with external communication signals.

It is also an object of the invention to provide such a system for locating a parent device with a child device.

It is a further object of the invention to provide such a system for locating a child device with a parent device.

The above objects and others not specifically recited are realized through a system for selectively detecting the presence of a plurality of objects in proximity to a person. The system includes a plurality of child units each having a first communicating device (such as a transceiver) for sending a locator signal and for receiving a control signal. Further, the system includes a parent unit having a second communicating device for receiving the locator signal from at least one of the plurality of child units, electronic means, such as a processor, microprocessor, analog circuitry, or other electrical devices known in the art, for monitoring the at least one child unit and for determining whether the child unit is within a preselected range, at least one alarm for signaling the person when the selected child unit is outside the preselected range, and controls for selectively controlling the child units to be monitored and for controlling activation of the child units.

In a preferred embodiment, the system includes global positioning devices associated with each of the parent units and child units for determining relative positions of the parent and child units. In another preferred embodiment, the controls are capable of controlling activation of the child units and allow a user to add or eliminate child units that the user would like monitored.

In yet another preferred embodiment in accordance with the present invention, the parent device can automatically detect external communication devices that require the parent device to cease communicating with one or more child devices and thus will automatically shut down when such external devices are detected. An electronic timer may also be included such that the parent device automatically reestablishes communications with the child devices after a preselected time period.

In still another preferred embodiment, the child device can be controlled to independently locate the parent device.

In another preferred embodiment, the parent unit includes a tracking mechanism for assisting a user in locating one or more of the child units The tracking mechanism may include global positioning devices or various devices that can detect the strength of a signal transmitted by a child unit. Preferably, the tracking mechanism includes a display that indicates the proximity to a particular child unit.

Additional objects and advantages of the invention will be set forth in the description which follows, and in part will be apparent from the description, or may be learned by the practice of the present invention. The objects and advantages of the invention may be realized and obtained by means of the instruments and combinations particularly claimed in the appended claims.

BRIEF DESCRIPTION OF THE DRAWINGS

The above and other objects, features, and advantages of the invention will become apparent from a consideration of the following detailed description presented in connection with the accompanying drawings in which:

FIG. 4 illustrates a functional block diagram of a preferred embodiment of a parent device of the present invention when the parent device is turned on;

DETAILED DESCRIPTION

In general, the present invention includes a parent or local device that communicates with at least one child or remote device that is attached to objects that are proximate to and in the possession of a person, such as a portable computer, a day planner note book, a mobile telephone, a set of car keys, etc.

The parent and child devices can be used by the person to manage the objects by allowing the person to program the parent and child devices according to the person's desired management parameters For example, the person could attach a child device to their mobile telephone and program the parent device to indicate to the person when the mobile telephone exceeds a particular distance from the person. If the person has intentionally left the mobile telephone in a remote location that exceeds the particular distance that was programmed into the parent device, the person can de-activate the child device of the mobile telephone by indicating to the parent device that it should temporarily ignore signals from the mobile telephone device. Advantageously, the parent device can de-activate a single child device without affecting any other child devices. It should be noted that the parent and child devices include circuitry that may include processors, microprocessors, or analog or solid state electrical circuitry for programming numerous functions according to the desires of the person managing the objects. Of particular note, a child device can be used to locate the parent device if the parent device is misplaced or lost. Furthermore, the parent device can automatically detect certain external communication signals, such as an airline transponder, that require communication signals between the parent and child devices to cease. Upon detecting certain external communication signals, the parent device will automatically shut down itself and the child device for safety purposes.

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the appended claims.

Figure 1:
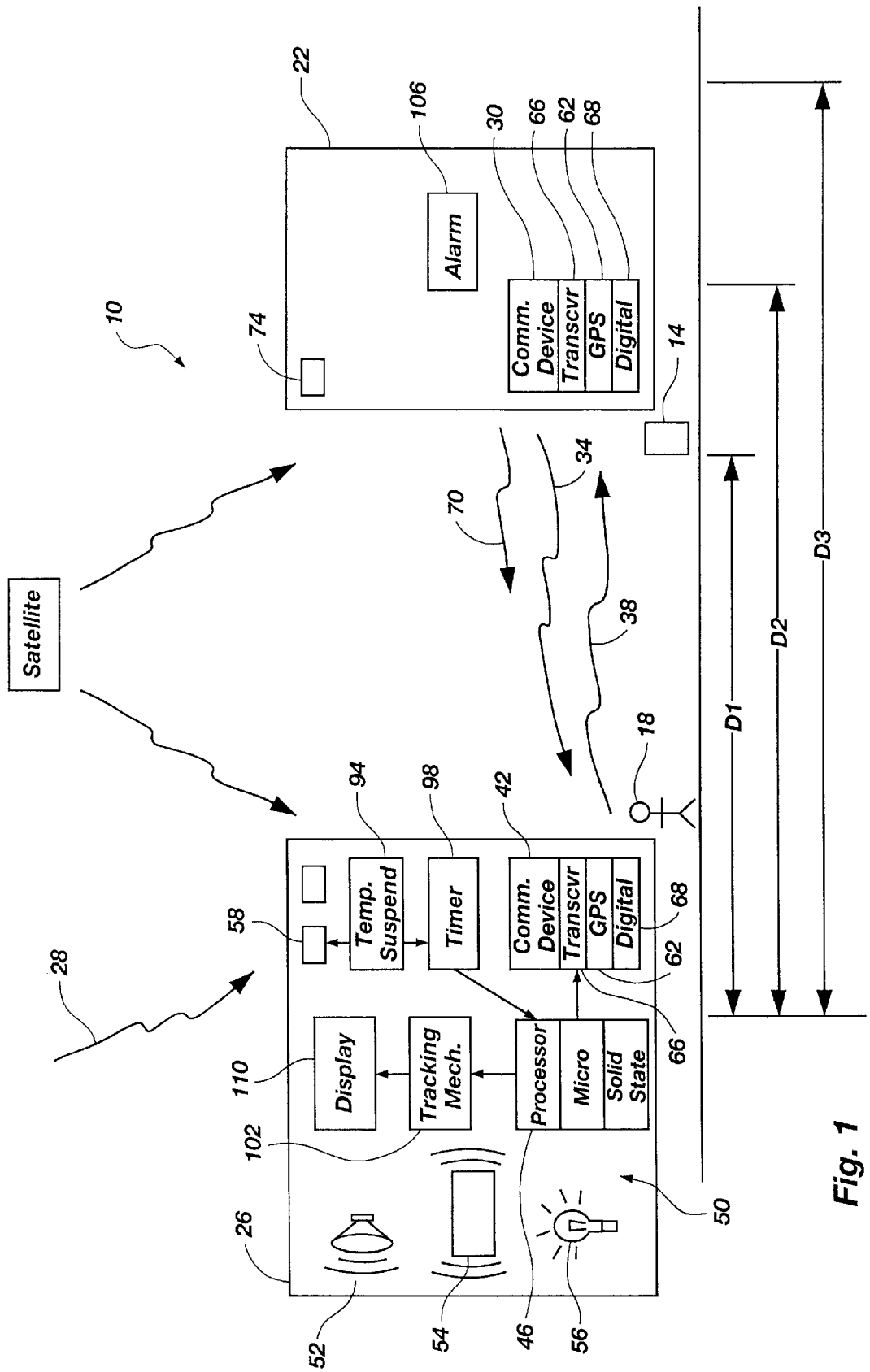
FIG. 1 illustrates a schematic view of a preferred embodiment of a system for detecting the present of a plurality of objects of the present invention.

As illustrated in FIG. 1, a system, indicated generally at 10, for selectively detecting the presence of a plurality of objects 14 in proximity to a person 18 in accordance with the present invention is shown. The plurality of objects 14 may include children or other valuables. The system 10 includes a plurality of child or remote units 22 and a parent or local unit 26. The child units 22 are attached or otherwise located with each of the plurality of objects 14. The parent unit 26 is carried by or otherwise located with the person 18.

The child units 22 each have a first communicating device 30 for sending a locator signal 34 and for receiving a control signal 38. The parent unit 26 has a second communication device 42 for receiving the locator signal 34 from at least one of the plurality of child units 22, or a selected child unit, and for sending the control signal 38. The first and second communicating devices 30 and 42 may be transceivers or global positioning devices as discussed more fully below.

The parent unit 26 has electronic means such as processor 46 for monitoring at least one of the plurality of child units 22, or the signal 34 from each of the first communicating devices 30. The processor 46 also determines whether the at least one child unit 22 is within a preselected range, indicated by D1, D2, and D3, based on the signal 34 from the first communicating device 30. The processor 46 may be a microprocessor, analog or solid state electrical circuitry and/or other devices known in the art.

The parent unit 26 has at least one alarm or indicator 50 for signaling the person 18 when the at least one child unit 22, or the selected unit, is outside the preselected range D1, D2, or D3. The alarm 50 emits or produces a humanly perceptible alarm when the selected child unit 22 is outside the range D1, D2, or D3. The alarm emitted may be audible or silent, but is preferably humanly perceptible.

The at least one alarm or indicator 50 may include a speaker 52, a vibrator 54, and/or a light 56 for indicated when the selected child unit 22 is outside the preselected range D1, D2 or D3. The speaker 52 emits an audible signal. The vibrator 54 silently indicates by vibrating the device. The light 56, of course, emits a visible light. Thus, the alarm emitted by the alarm 50 may be silent, audible, and/or visible.

The alarm 50 may include all or various combinations of the above alarms for indicating in different ways when the selected child unit 22 is outside a first, second, and third preselected ranges D1, D2 and D3. For example, the at least one alarm 22 may include a vibrator 54 for indicating when the selected child unit 22 is outside a first preselected range Dl; a light 56 for indicating when the selected child unit 22 is outside a second preselected range D2; and a speaker 52 for indicating when the selected child unit 22 is outside a third preselected range D3. Thus, the alarm 50 progressively emits a series of vibration, light, and sound as the child unit 22 moves progressively through the first, second and third ranges D1, D2, and D3.

The parent unit 26 has controls 58 for selectively controlling the at least one child unit 22, or plurality of child units, to be monitored and for controlling activation of the child units 22. The parent unit 26 may selectively activate or de-activate any of the plurality of child units 22. Thus, the controls 58 allow the parent unit to control which child units 22 are activated. In addition, the parent unit 26 may also selectively monitor the child units 22. Thus, the controls 58 allow the parent unit to monitor only selected child units 22.

As indicated above, the communicating devices 30 and 42 may be transceivers 66. The transceivers 66 may transmit continuously or in pulses. Alternatively, the communicating devices 30 and 42 may be digital devices 68 for sending digital signals. In a preferred embodiment, global positioning devices 62 are employed to calculate global positions of the child unit 22 and the parent unit 26. Thus, a global positioning device 62 is associated with each of the parent units 26 and child units 22. The processor 46 may use the global positions for determining a relative position of the child unit 22 with respect to the parent unit 26 resulting in a range D1, D2 or D3.

In addition, the child units 22, or the first communicating device 30, advantageously may send a signal 70 for locating the parent unit 26. Thus, not only can the parent unit 26 send a signal to locate the child unit 22, but the child unit 22 can send a signal 70 to locate the parent unit 26. The child unit 22 may have a control 74 for activating the first communicating device 30 to send the signal 70. The signal 70 sent by the child unit 22 may cause the parent unit 26, or alarm 50 or the parent unit, to emit an alarm, either silently, audibly, and/or visibly.

The processor 46 may be programmable to control various features and functions of the units 22 and 26. For example, the processor 46 advantageously may be programmed to de-activate the first and second communicating devices 30 and 42 when the second communication device 42 detects certain external communication signals 28. Selective de-activation may include deactivating the locator signal 34 of the first communicating device 30. In such a situation, the controls 58 of the parent unit 26 are set to de-activate the locator signal 34 of the first communicating device 30. Such a situation may occur in airline travel where certain signals, which may include the signals 34 and 38 produced by the first and second communicating devices 30 and 42 of the units 22 and 26, are restricted. Such an external communication signal 28 may be a transponder signal associated with airline travel. The processor 46 causes the second communicating device 42 of the parent unit 26 to send a control signal 38 to the child unit 22 causing the child unit 22 to de-activate. In addition, the processor 46 causes the parent unit 26 to de-activate. The units 22 and 26 may remain de-activated until manually activated by the person, or may automatically re-activate after a certain time period. De-activation of the child units 22 also may be controlled manually as previously described.

The parent unit 26 may have a mechanism 94 for temporarily terminating signals 34 and/or 38 between the first and second communicating devices 30 and 42. The parent unit 26 may also have an adjustable timer 98 for selecting a period of temporary termination of the signals 34 and/or 38. The signals 34 and 38 may be terminated by the mechanism 94 in response to the external communication signals 28 as discussed above. In addition, the signals 34 and 38 may be terminated by the mechanism 94 in response to the controls 58 when desired by the person.

The parent unit 26 may also have a tracking mechanism 102 for locating the at least one child unit 22. The child unit 22 may include an alarm or indicator 106, similar to the alarm 50 of the parent unit 26, for producing or emitting an alarm when signaled by the tracking mechanism 102 of the parent unit 26. The tracking mechanism 102 may include a display 110 for indicating the proximity of the at least one child unit 22 to the parent unit 26. The tracking mechanism 102 may cause the second communicating device 42 of the parent unit 26 to send a signal 38 to the child unit 22, which in turn causes the alarm 106 of the child unit 22 to emit an alarm.

Figure 2:
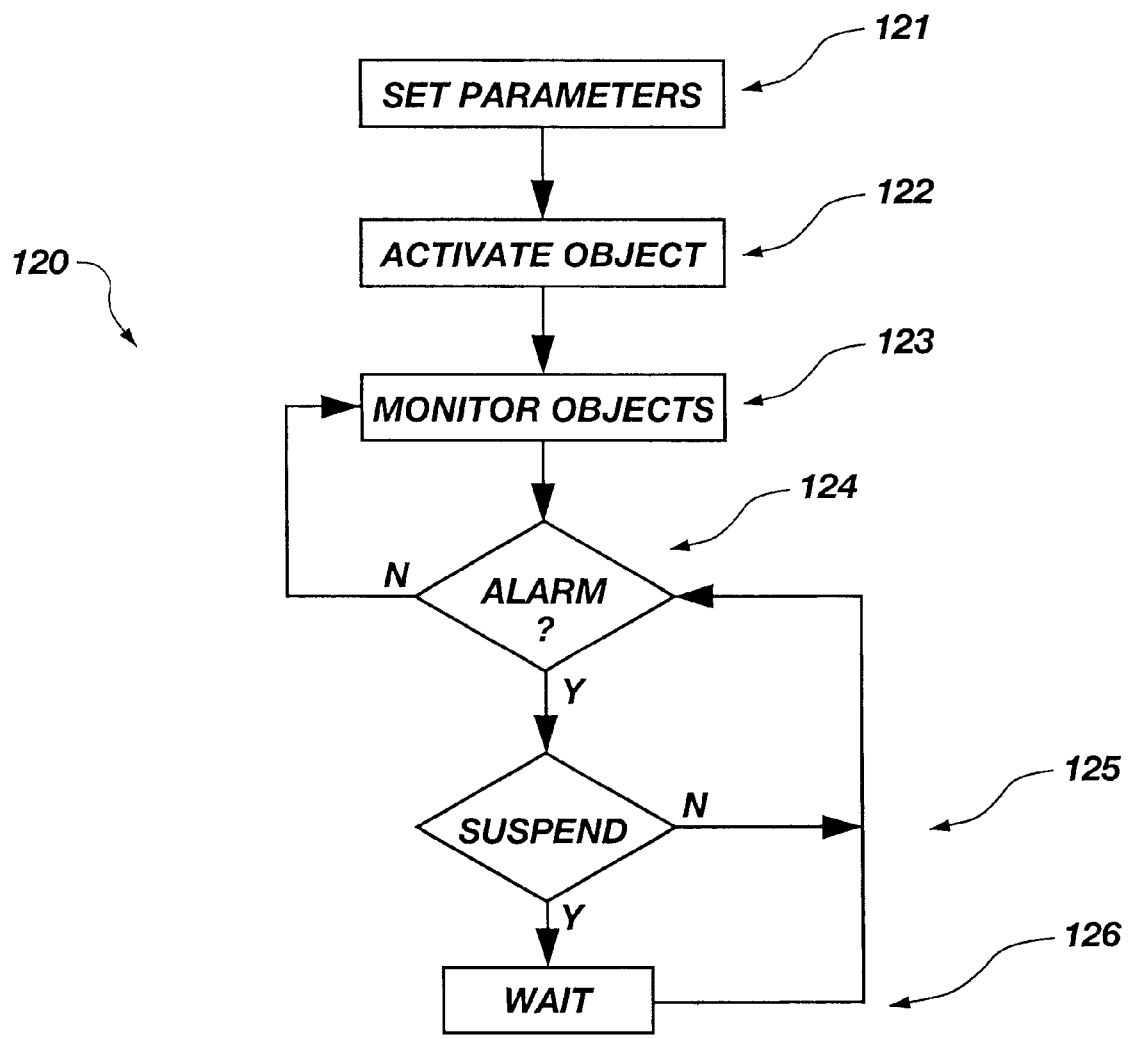
FIG. 2 illustrates a functional block diagram of a preferred embodiment of a parent device of the present invention.

FIG. 2 illustrates a functional block diagram of an embodiment of the parent unit of the present invention wherein schematic blocks illustrate the functions of the parent unit and the following functions are shown: setting parameters of the parent device 121, selectively activating objects 122, and monitoring objects 123. Also shown is a block representing the function for detecting whether an alarm state exists 124 in the parent device. If no alarm state exists, then the parent device continues to monitor objects but if an alarm state exists, the parent device has the function of choosing whether to suspend the alarm state 125 and enter a temporary waiting state 126, or not to suspend the alarm state but to again detect whether an alarm state exists in the parent device. Of course, the functional block diagram of FIG. 2 is a simple embodiment of the present invention and additional functions such as automatically de-activating the parent device upon detection of certain external communication signals can be added. Further, a function for detecting a signal from the child device could be added when the child device is used to locate the parent device. Still further, the parent device can have the function of choosing to selectively de-activate a single child device. Those skilled in art and viewing the invention will understand that additional functions can be implemented in the parent device.

Figure 3:
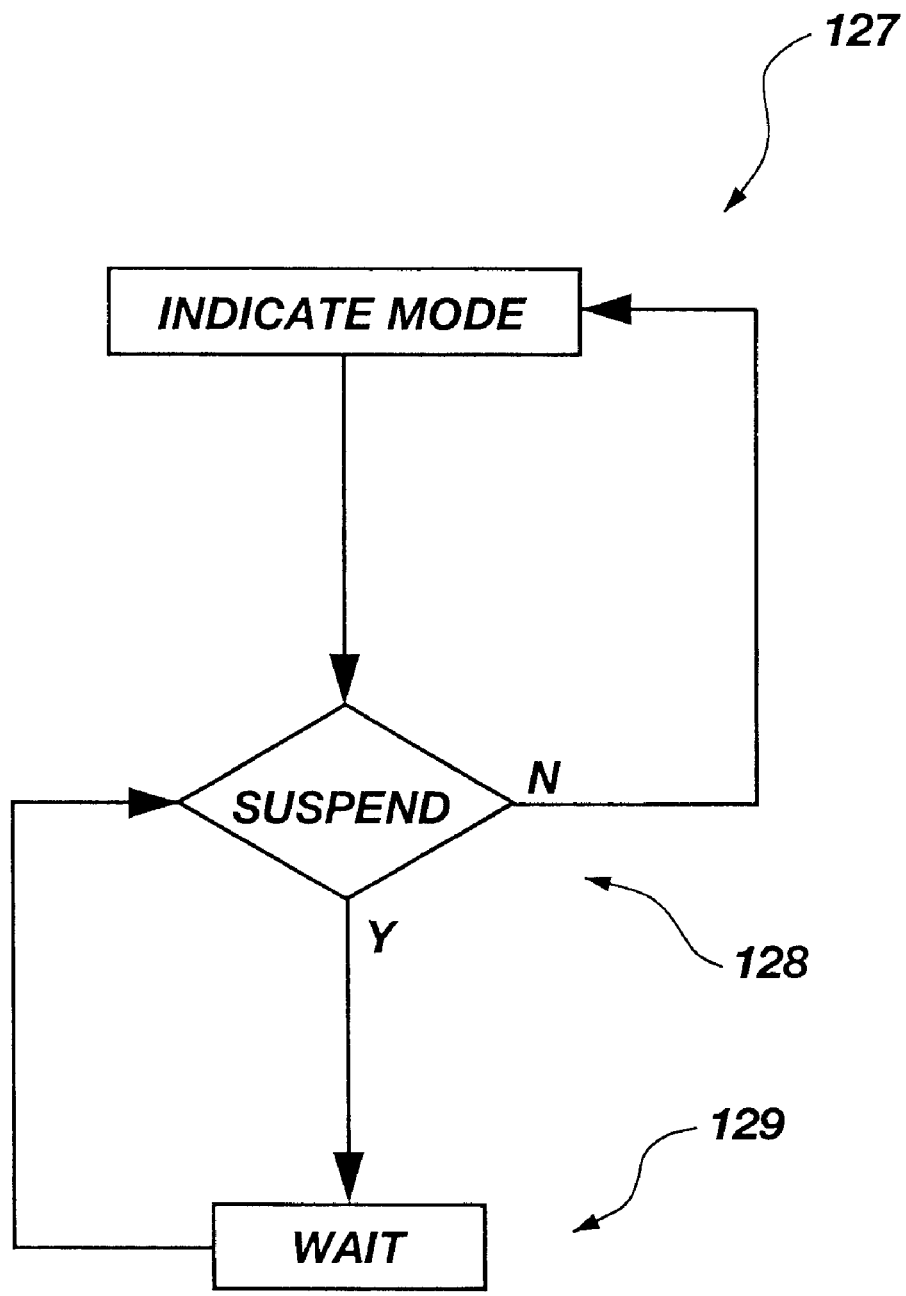
FIG. 3 illustrates a functional block diagram of a preferred embodiment of a child device of the present invention.

FIG. 3 illustrates a functional block diagram of an embodiment of the child device. Similar to FIG. 2, the block diagram is an embodiment which shows basic functions of the child device. The function of an indicator mode 127 for indicating a current status to the parent unit is shown leading to the suspend function 128. This arrangement allows the child device to remain in the indicator mode 127 until the child device is suspended. Once it is suspended, the child device enters a wait state 129 where the device is de-activated for a predetermined amount of time before it returns to the indicator mode 127.

Figure 4:
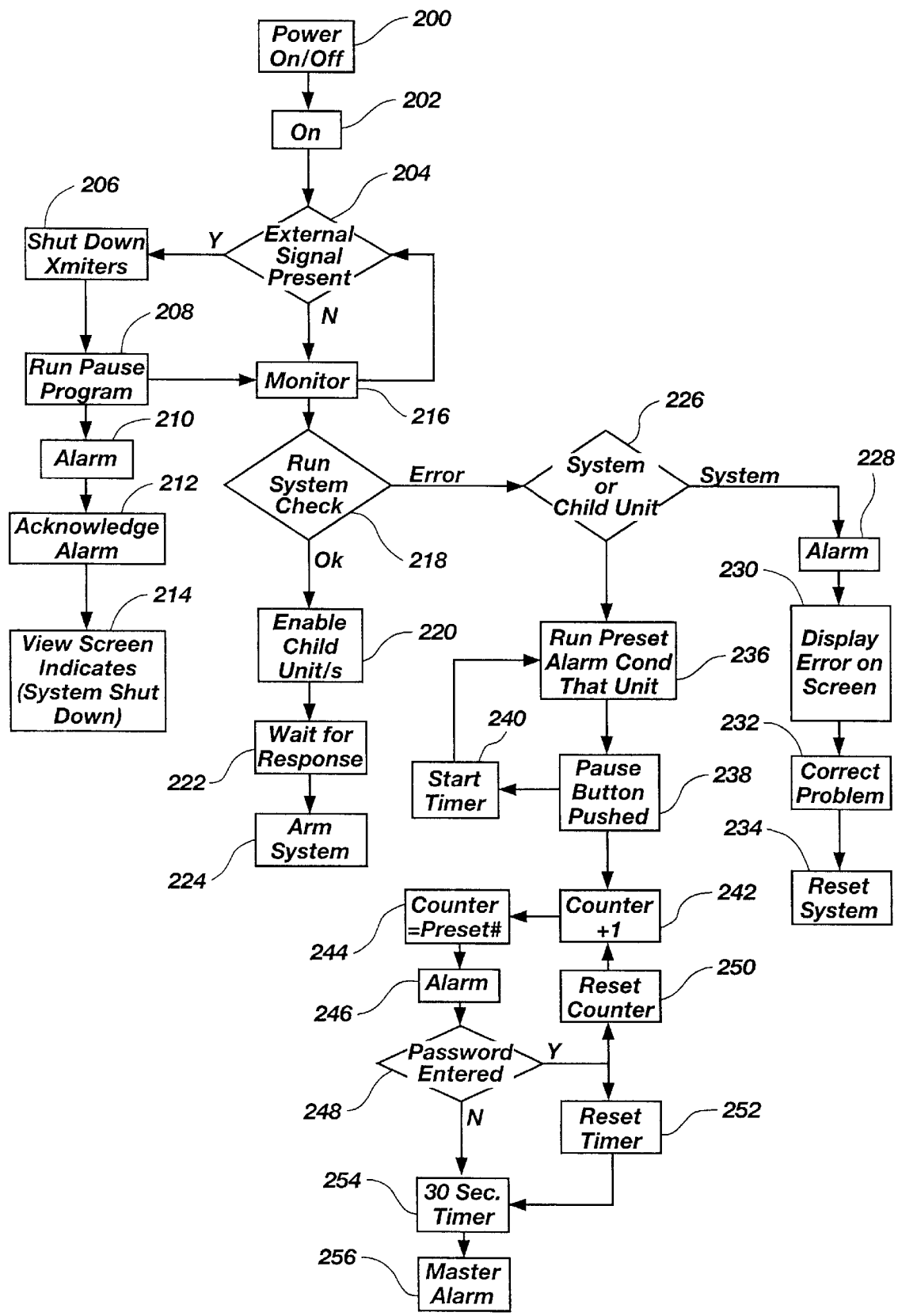
Figure 5:
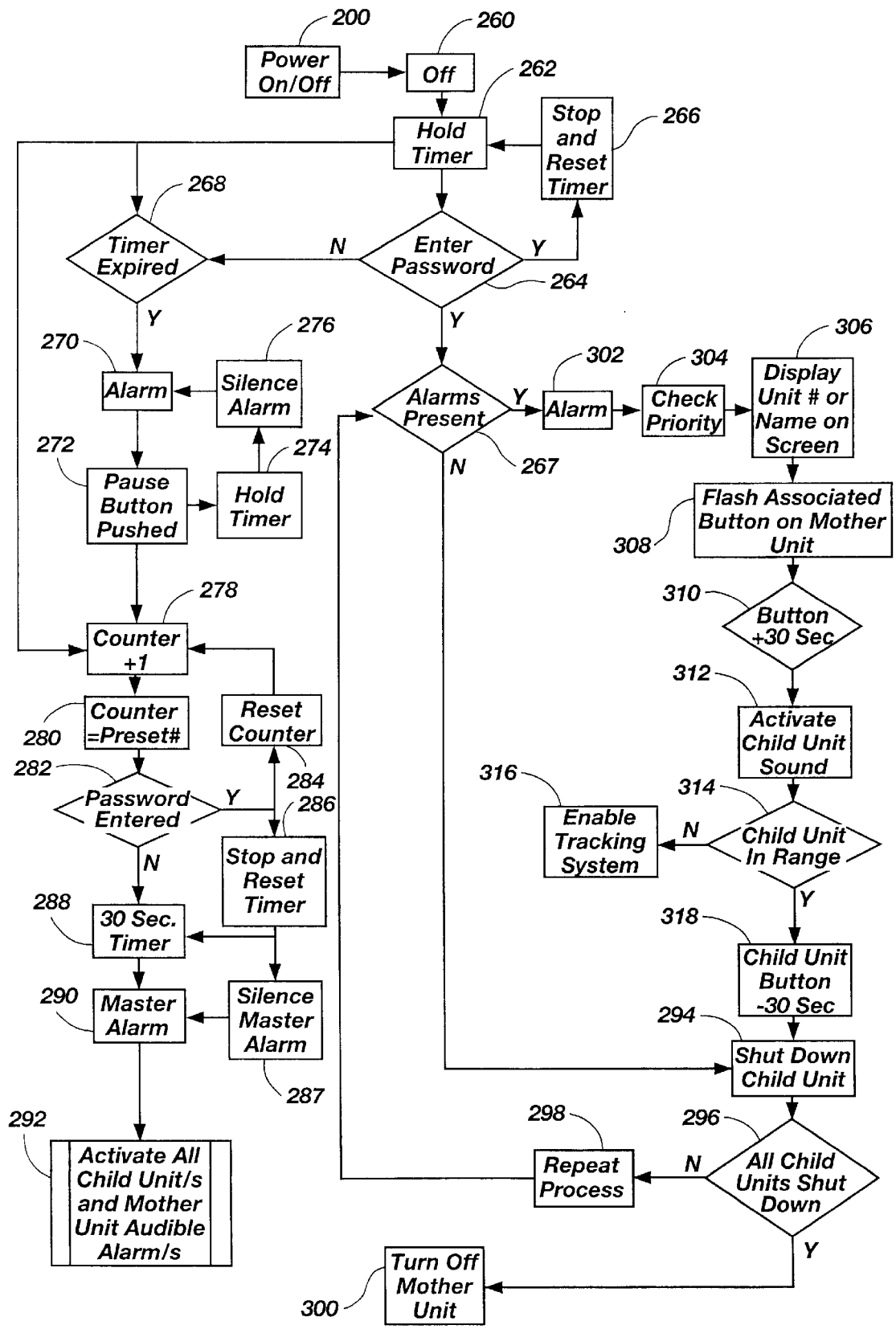
FIG. 5 illustrates a functional block diagram of a preferred embodiment of a parent device of the present invention when the parent device is turned off.

FIGS. 4 and 5 illustrate functional block diagrams of an embodiment of the parent unit of the present invention wherein schematic blocks illustrate the functions of the parent unit. FIG. 4 illustrates the function of the parent unit when the unit turned on, while FIG. 5 illustrates the function of the parent unit when the unit is turned off.

Referring now to FIG. 4, the parent unit has a power switch or on/off control 200. When the unit is turned on 202, the parent unit checks to see if an external signal is present 204, as discussed above. If the parent unit detects an external signal, it shuts down 206, or de-activates, the transmitters, or communicating devices The parent unit may then run a pause program 208. After the pause program 208, the parent device may emit an alarm 210 which may be acknowledged 212 by the person. The parent unit indicates 214 the status of the unit, such as by a view screen or display indicating the unit or system has shut down or has been de-activated After the pause program 208, the parent device may begin monitoring 216. In addition, the parent unit continues to check for external signals 204. If no external signal is detected, then the parent unit monitors 216.

The parent unit also runs a system check 218. If no errors are detected in the system check 218, then the child units are enabled 220, or a signal is sent to the child units. The parent unit then waits for a response 222 from the child units and then arms 224.

If an error is detected, the unit determines if the error is with a child unit or the system or parent unit, indicated at 226. If the error is with the system, the parent unit emits an alarm 228 and indicates the error 230, such as on a display or screen. The error may then be corrected 232 and the system reset 234.

If the error is with the child unit, the parent device runs a preset alarm condition for that unit 236. The alarm condition 236 may be paused 238, such as by pushing a pause button. A timer is then started 240 after which the alarm condition is again run 236. In addition, a counter is advanced 242. The counter is checked 244 to see if it has reached a preset number. The parent unit then emits an alarm 246. The person may enter a password 248. If the person enters the correct password, the person may reset the counter 250 and reset the timer 252. If the password is not entered or if an incorrect password is entered, then the timer runs 254 for a period of time, for example 30 seconds, and then a master alarm sounds 256.

Referring now to FIG. 5, the parent unit has a power switch or on/off control 200. When the unit is turned off 260, the parent unit has a hold timer 262 that holds for a period of time. The person may enter a password 264. If the correct password is entered, then the timer may be stopped and reset 266. In addition, if the correct password is entered, the parent device checks to see if alarms from the child units are present 267, as discussed more fully below.

If the incorrect password is entered or if the password is not entered timely, the timer expires 268 and the parent unit emits an alarm 270. The alarm may be paused 272, such as by pushing a pause button. If the alarm is paused, a hold timer holds for a period of time 274 and the alarm is silenced 276. After the time elapses, the unit again emits an alarm 270.

In addition, when the alarm is paused 272, or when the time elapses from the hold timer 262 when the system is turned off 260, a counter is advanced 278. When the counter reaches a preset value or number 280, the person may enter a password 282. If the correct password is entered, the person may reset the counter 284 and stop and reset the timer 286. If the timer is stopped and reset, then the master alarm is silenced 287.

If the password is not entered or if an incorrect password is entered, then the timer runs 288 for a period of time, for example 30 seconds, and then a master alarm sounds 290. In addition, the parent unit activates all the child units and the parent unit emits an alarm 292.

As indicated above, if the correct password is entered after the parent unit is turned off 260, the parent unit checks the child units to see if any alarms are present 267. If no alarm is present for a child unit, then the child unit is shut down 294. The parent unit then checks to see if all the child units are shut down 264, or de-activated. If all the child units are not shut down, the process repeats 298, checking for alarms 267 and shutting down child units 294. If all the child units are shut down, then the parent unit turns off 300, or shuts down.

If the parent unit detects an alarm from the child unit after the password is entered, it emits an alarm 302. The parent unit checks the priority 304 of the alarm and indicates which unit has the alarm 306, such as by displaying the unit number on a screen The parent unit may have a button associated with each child unit that flashes 308 when the child unit has an alarm. The person may push the button 310 for a period of time. If the button is pushed, the child unit emits an alarm or other sound 312.

The parent unit checks to see if the child unit is in range 314. If the child unit is not in range, the tracking system is enabled 316. If the child unit is in range, the person may push the button 318 and the child unit will be shut down 294.

Figure 6:
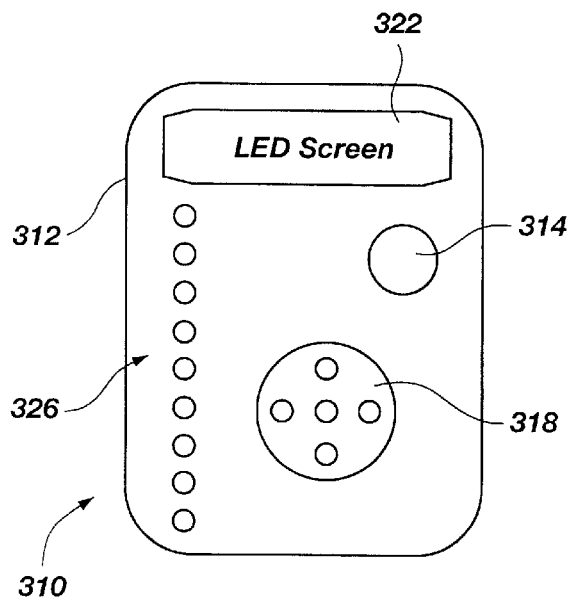
FIG. 6 illustrates a front view of a preferred embodiment of a parent unit of the present invention.
Figure 7:
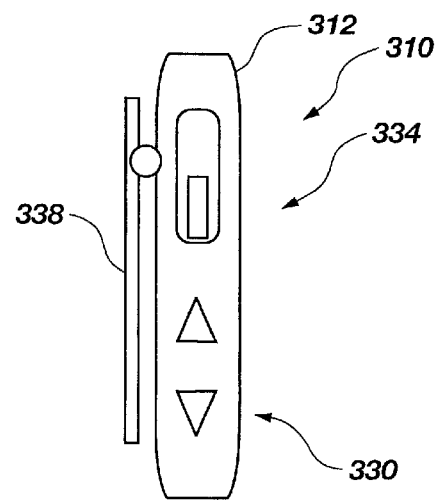
FIG. 7 illustrates a side view of a preferred embodiment of the parent unit of the present invention.
Figure 8:
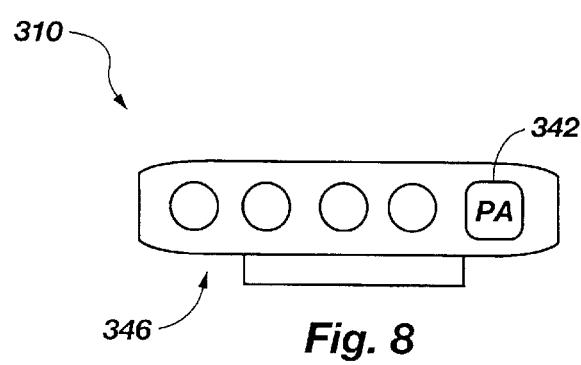
FIG. 8 illustrates a top view of a preferred embodiment of the parent unit of the present invention.

FIGS. 6–8 illustrate different views of a preferred embodiment of a parent unit 310 of the present invention. FIG. 6 shows a front view of a housing 312 of the parent unit 310 wherein a reset button 314 is shown for resetting transmissions between parent and child devices in the invention. Further, if the reset button 314 is held down, for example for approximately two seconds, the parent unit 310 may be set into a programming mode in which various programming parameters can be entered into the parent unit (to be discussed in relation to FIGS. 7 and 8). FIG. 6 also shows a speaker 318 for indicating various conditions or mode changes in the parent unit 310. Once the parent unit 310 is properly programmed, the speaker 318 may make an audible sound to alert the person using it of changes in the parent unit such as low battery or mode changes. The audible sound could be a recorded voice message or simply an alarm sound. Further, the audible sound could change tone or frequency as the parent unit 310 alters its range from the object. In addition, FIG. 6 shows a display screen 322 in the housing 312 of the parent unit 310 for displaying information about the mode and function of the parent unit. For example, the display screen 322 can be used to display information such as system status, alarm distances, timer settings, and object names. Finally, FIG. 6 illustrates a series of lights 326 on the housing In one mode of the parent unit 310, these lights 326 will assist the person using the parent unit 310 to find a lost or misplaced object by lighting up (or turning off) one at a time as the person nears the object. Of course, the function of the series of lights 326 could just as well be performed by a digitally displayed image of a bar on the display screen 322; the bar would adjust in length depending on the distance of the parent unit 310 from the object. If a global positioning system is employed, the display on the parent unit could merely point to the direction of the lost child unit. These tracking functions are sometimes collectively referred to as a tracking mechanism. Further, the above described "alarms" are only limited in that they are humanly perceptible signals, e.g., a vibration, an audible sound, a light, etc. In general, these humanly perceptible signals are produced through what is sometimes referred to as an alarm mechanism. The above and other functions of the parent unit 310 are implemented through a processor such as a microprocessor or analog or solid state electrical circuitry that operates in conjunction with a communicating device such as a transceiver to communicate with the child device. This communicating device could operate as either a digital or analog device.

FIG. 7 shows a side view of the parent unit 310 in which arrow keys 330 are illustrated on the housing 312. When the parent unit 310 is in the appropriate mode, the arrow keys 330 perform a control function such as adjusting a value of a number that represents a distance or time value. Of course, one of the arrow keys 330 will increase the value while the other arrow decreases the value. Also shown in FIG. 7 is a power switch 334 for activating or deactivating the parent unit 310. This function is sometimes referred to as "selective activation" and indicates that the parent unit 310 (as well as the child device) can be selectively turned on or off. When the parent unit 310 is turned on (activated), the unit may start a self check program which determines if all components of the unit are in proper working condition. For example, the self check program may check the speaker 318 (FIG. 6), the display screen 322 (FIG. 6), the series of lights 326 (FIG. 6), etc. If the conditions are satisfactory, the parent unit 310 will continue operation. Alternatively, when the parent unit 310 is turned off (de-activated), the unit will indicate that the system has been turned off through means such as a "shut down" message on the display screen 322 (FIG. 6). After the parent unit 310 indicates that the power has been turned off, the person using the parent unit may have a set amount of time in which to acknowledge that the system has been powered off. Thus, the person may acknowledge power off by pressing the reset button 314 (FIG. 6) at which time the self check program is run and, if there are no error conditions, the parent unit 310 shuts down as well as suspending signals from the child device. In the event that there is an error condition, the display screen 322 (FIG. 6) will display the error condition and the unit can be serviced. Also shown in FIG. 7 is a clip 338 attached to the housing 312 for attaching the parent unit 310 to an object. Of course, rather than the clip 338, the housing 312 could have hook and loop material, a snap, or other attachment assemblies for attaching the parent unit 310 to the person managing the objects.

FIG. 8 shows a top view of the parent unit 310 wherein a pause button 342 for temporarily shutting down the parent unit is illustrated. When the pause button 342 is activated while the parent unit 310 is operating in normal mode, the pause button shuts the parent unit down for a selectable length of time (usually approximately 15 minutes) and will notify the person, for example every minute, after the time period has expired until the person reactivates the parent unit as by pressing the reset button 314 (FIG. 6) or by pressing the pause button again. When the pause button 342 is activated while the parent unit 310 is operating in an alarm mode, the pause button causes the parent unit to discontinue indicating the alarm mode for a selectable length of time (such as approximately 5 minutes) at which time the parent unit will again indicate the alarm mode if it is still present.

Also shown in FIG. 8 is a set of four object indicator buttons 346. When pressed, each of these buttons 346 enable (or disable) the tracking of a particular child device while placing the other child devices on hold. The object indicator button 346 that is pressed is associated with the particular child device to be managed, thus, each of the objects can be managed separately by pressing the corresponding object indicator button. Of course there can be more or less buttons in other embodiments and the embodiment of FIG. 8 is only illustrative. Further, the object indicator buttons 346 may each include a light that flashes on or off according to the distance of a child device from the parent unit 310.

As stated above, the parent unit 310 of FIGS. 6–8 has programmable parameters that can be adjusted when the reset button 314 (FIG. 6) is held down as for approximately two seconds. These parameters may be programmed through use of the pause button 342 (FIG. 8), the up/down arrow keys 330 (FIG. 7), the object indicator buttons 346 (FIG. 8), or a combination thereof, collectively referred to as a parent control mechanism. For example, the parent unit 310 may be programmed to signal a user with lights when the child device has exceeded a certain distance from the parent unit 310 and to signal the user audibly when the child device has exceeded a further distance from the parent unit 310. In one embodiment where the parent unit 310 includes a vibrator, the parent unit can be programmed to activate the vibrator at a first distance from the child device for silently indicating when the child device is outside the first distance, to activate lights at a second distance, and to activate an audible alarm at a third distance. Thus, the parent unit 310 can be programmed to activate multiple alarm modes according to variable distances between the parent unit and the child devices. As stated above, this programming is performed through use of the processor such as a microprocessor or the solid state electrical circuitry.

Figure 9:
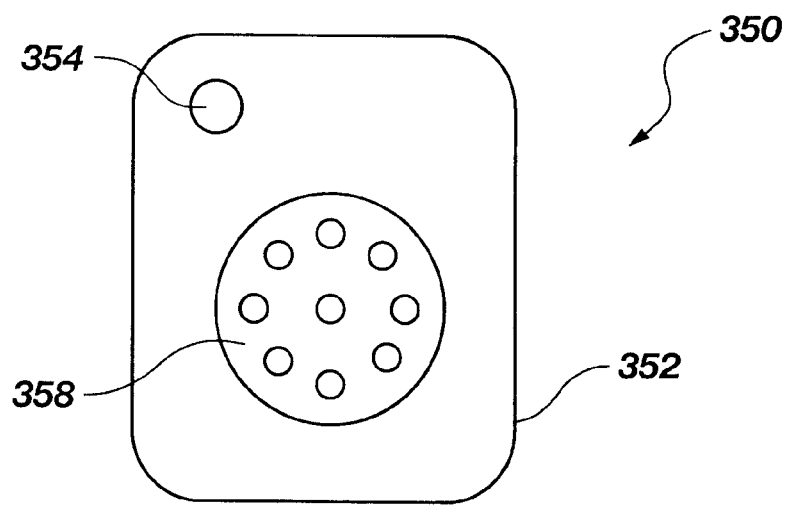
FIG. 9 illustrates a front view of a preferred embodiment of a child unit of the present invention.
Figure 10:
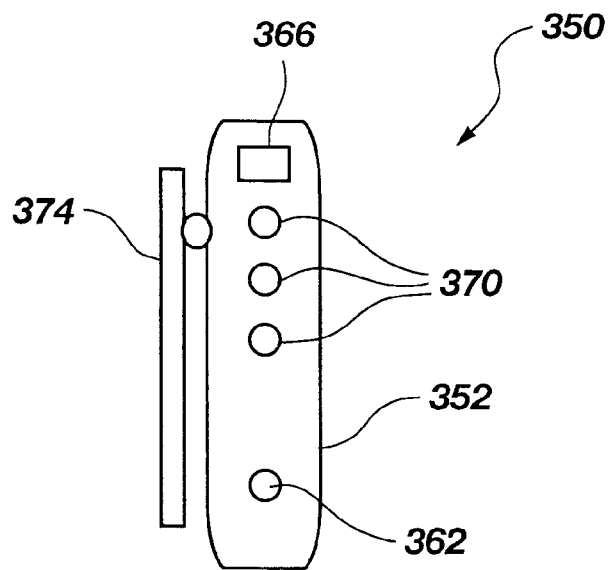
FIG. 10 illustrates a side view of a preferred embodiment of the child unit of the present invention.

In a presently preferred embodiment, the child device is shown in FIGS. 9 and 10 and will be referred to as a child unit 350. FIG. 9 shows a front view of the child unit 350 wherein, the child unit is shown having a housing 352 with a hole 354 in one of the corners for attaching the child unit to an object such as a key chain. The child unit 350 also has a speaker 358 that is attached to the housing 352 and is controlled by circuitry that is internal to the housing. This internal circuitry controls the speaker 358 through electrical signals that it receives from the parent unit 310 of FIGS. 6–8. The electrical signals are received with a communicating device such as a transceiver or a global positioning device. For example, the parent unit 310 (FIGS. 6–8) could be programmed to cause the speaker 358 to make an audible sound so that a user could easily locate the child unit 350. In one embodiment, the communicating devices of the parent unit 310 and of the child unit 350 are components of a global positioning device that can be used to calculate a relative position between the parent unit and the child unit, i.e., the processor of the system calculates the range from the parent unit to the child unit through signals from the global positioning device. It should be noted that the communicating device of the child unit 350 can also send a locator signal to the parent unit 310 so that the parent unit can track the child unit. In the event that the communicating devices of the parent unit 310 and the child unit 350 are transceivers, it should be noted that the transceivers can transmit signals continuously or in pulses.

FIG. 10 shows a side view of the child unit 350 wherein a locator button 362 is shown disposed in the housing 352. The locator button 362 can be used to locate the parent unit 310 (FIGS. 6–8) by causing the parent unit to emit an audible signal when the locator button is pressed. In addition, the child unit 350 is shown having a reset button 366 and a plurality of lights 370. The reset button 366 provides similar functions as the reset button 314 (FIG. 6) of the parent unit 310, however, less programmability options are available through the child unit. The plurality of lights 370 can be used to indicate whether the holder of the child unit 350 is nearing the parent unit 310 (FIGS. 6–8) by either lighting up (or turning off) one at a time as the child unit nears the parent unit. Thus, the locator button 362 and the reset button 366 are sometimes collectively referred to as a child control mechanism. Finally, the child unit 350 is shown having a clip 374 attached to the housing for attaching the child unit to an object. Of course, rather than the clip 374, the child unit 350 could be attached to objects with hook and loop material, a snap, an elastic strap, or other means familiar to those skilled in the art of attaching one object to another.

With the system of FIGS. 6–10, the user can manage objects that are in their possession by attaching a child unit 350 to each of the objects they would like to track and then programming the parent unit 310 to contain the desired management parameters, i.e., distances, timers, etc. Thus, the user can select exactly how they want to be notified when one of the objects in their possession is not where it should be. Further, the user can modify their management parameters on the fly when they have changed how they would like to be notified. A significant advantage of the present invention is the ability to deactivate selected child units from the parent unit, thus, allowing the user to change their mind concerning which objects need to be managed.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A system for selectively detecting the presence of a plurality of objects in proximity to a person comprising:
   a plurality of child units each having a first communicating device for sending a locator signal and for receiving a control signal;
   a parent unit having a second communicating device for receiving the locator signal from at least one of the plurality of child units, a processor for monitoring the at least one child unit and for determining whether the at least one child unit is within a preselected range, the processor of the parent unit programmed to de-activate the second communicating device of the parent unit and the first communicating device of each of the plurality of child units when certain external communication signals are detected by the second communication device, and controls for selectively controlling the child units to be monitored.

2. The system of claim 1 wherein the processor of the parent unit comprises a microprocessor.

3. The system of claim 1 wherein the processor of the parent unit comprises at least one of analog and digital circuitry.

4. The system of claim 1 wherein the first and second communicating devices comprise a first and a second transceiver.

5. The system of claim 1 further comprising a first global positioning device associated with the parent unit and a second global positioning device associated with the child unit for providing global positions of the child unit and the parent unit, the global positions for determining a relative position of the child unit with respect to the parent unit.

6. The system of claim 1 wherein the first communicating device of the child unit comprises a control mechanism for sending a signal to the second communicating device for locating the parent unit with the child unit.

7. The system of claim 1 wherein the parent unit further including at least one alarm comprising at least one of a speaker, a vibrator and at least one light for indicating when the selected child unit is outside the preselected range.

8. The system of claim 7 wherein the at least one alarm of the parent unit comprises a vibrator for silently indicating when the selected child unit is outside a first preselected range, a light for indicating a visual signal when the selected child unit is outside a second preselected range, and a speaker for indicating an audible signal when the selected child unit is outside a third preselected range.

9. The system of claim 7 wherein the controls of the parent unit for selectively controlling the child units include a mechanism for adjusting the preselected range at which the at least one alarm will signal the person when the selected child unit is outside of the preselected range.

10. The system of claim 7 wherein the at least one alarm is a variable alarm that varies according to the distance between the parent unit and the at least one child unit.

11. The system of claim 1 wherein the parent unit includes a mechanism for temporarily terminating signals between the second communicating device of the parent unit and the first communicating device of each of the plurality of child units, and an adjustable timer for selecting a period of temporary termination of the communication signals.

12. The system of claim 1 wherein the parent unit includes a tracking mechanism for assisting the person to locate at least one of the plurality of child units with the parent unit.

13. The system of claim 12 wherein the child unit includes an alarm mechanism for producing a humanly perceptible alarm when signaled by the tracking mechanism of the parent unit.

14. The system of claim 12 wherein the tracking mechanism includes a display for indicating the proximity of the at least one child unit to the parent unit.

15. The system of claim 1 wherein said first and second communicating devices each comprise digital communicating devices.

16. The system of claim 1 wherein said processor of said parent unit is programmed to selectively de-activate at least one of the child units, wherein the selective de-activation includes deactivating the locator signal of the first communication device.

17. A system for selectively detecting the presence of a plurality of objects in proximity to a person comprising:
   a plurality of child units each having a first communicating device for sending a locator signal and for receiving a control signal;
   a parent unit having a second communicating device for receiving the locator signal from at least one of the plurality of child units, a processor for monitoring the at least one child unit and for determining whether the at least one child unit is within a preselected range, a mechanism for temporarily terminating signals between the second communicating device of the parent unit and the first communicating device of each of the plurality of child units, and controls for selectively controlling the child units to be monitored and for controlling activation of the child units.

18. The system of claim 17 wherein the processor of the parent unit comprises a microprocessor.

19. The system of claim 17 wherein the first and second communicating devices comprise a first and a second transceiver.

20. The system of claim 17 further including a first global positioning device associated with the parent unit and a second global positioning device associated with the child unit for providing global positions of the child unit and the parent unit, the global positions for determining a relative position of the child unit with respect to the parent unit.

21. The system of claim 17 wherein the first communicating device of the child unit comprises a control mechanism for sending a signal to the second communicating device for locating the parent unit with the child unit.

22. The system of claim 17 wherein the mechanism temporarily terminates signals between the second communicating device of the parent unit and the first communicating device of each of the plurality of child units when certain external communication signals are detected by the second communication device.

23. The system of claim 17 wherein the parent unit further includes at least one alarm comprising at least one of a speaker, a vibrator and a light for indicating when the selected child unit is outside the preselected range.

24. The system of claim 23 wherein the at least one alarm is a variable alarm that varies according to the distance between the parent unit and the at least one child unit.

25. The system of claim 17 wherein the parent unit includes an adjustable timer for selecting a period of temporary termination of the communication signals.

26. The system of claim 17 wherein the parent unit includes a tracking mechanism for assisting the person to locate at least one of the plurality of child units with the parent unit.

27. The system of claim 26 wherein the tracking mechanism includes a display for indicating the proximity of the at least one child unit to the parent unit.

28. The system of claim 17 wherein the controls of the parent unit for selectively controlling the child units include a mechanism for adjusting the preselected range at which the at least one alarm will signal the person when the selected child unit is outside of the preselected range.

29. A system for selectively detecting the presence of a plurality of objects in proximity to a person comprising:

a plurality of child units each having a first communicating device for sending a locator signal and for receiving a control signal;

a parent unit having a second communicating device for receiving the locator signal from at least one of the plurality of child units, a processor for monitoring the at least one child unit and for determining whether the at least one child unit is within a preselected range, the processor of the parent unit programmed to selectively de-activate at least one of the at least one child unit, the selective de-activation includes deactivating the locator signal of the first communication device of the at least one of the at least one child unit, and controls for selectively controlling the child units to be monitored.

* * * * *

(12) EX PARTE REEXAMINATION CERTIFICATE (7292nd)
United States Patent
Rabanne et al.

(10) Number: US 6,084,517 C1
(45) Certificate Issued: Jan. 5, 2010

(54) SYSTEM FOR TRACKING POSSESSIONS

(75) Inventors: Michael C. Rabanne, Salt Lake City, UT (US); Steven D. Ivie, West Valley City, UT (US)

(73) Assignee: MRSI International, Inc., Stansbury Park, UT (US)

Reexamination Request:
No. 90/010,218, Oct. 14, 2008

Reexamination Certificate for:
Patent No.: 6,084,517
Issued: Jul. 4, 2000
Appl. No.: 09/132,916
Filed: Aug. 12, 1998

(51) Int. Cl.
*G08B 21/02* (2006.01)
*G08B 21/00* (2006.01)
*G01S 5/00* (2006.01)
*G01S 5/14* (2006.01)

(52) U.S. Cl. .................................. 340/573.4; 340/691.3
(58) Field of Classification Search .................. None
See application file for complete search history.

(56) References Cited

U.S. PATENT DOCUMENTS

| | | | | |
|---|---|---|---|---|
| 5,528,232 A | * | 6/1996 | Verma et al. | 340/825.49 |
| 5,621,388 A | * | 4/1997 | Sherburne et al. | 340/573.4 |
| 5,661,460 A | * | 8/1997 | Sallen et al. | 340/573.4 |
| 5,771,002 A | * | 6/1998 | Creek et al. | 340/539.21 |
| 5,838,237 A | * | 11/1998 | Revell et al. | 340/573.1 |

FOREIGN PATENT DOCUMENTS

GB          2 246 891 A     * 12/1992

* cited by examiner

*Primary Examiner*—James Menefee

(57) ABSTRACT

A system for selectively detecting the presence of a plurality of objects in proximity to a person. The system includes a plurality of child units each having a first communicating device (such as a transceiver) for sending a locator signal and for receiving a control signal. Further, the system includes a parent unit having a second communicating device for receiving the locator signal from at least one of the plurality of child units, a processor for monitoring the at least one child unit and for determining whether the child unit is within a preselected range, at least one alarm for signaling the person when the selected child unit is outside the preselected range, and controls for selectively controlling the child units to be monitored and for controlling activation of the child units.

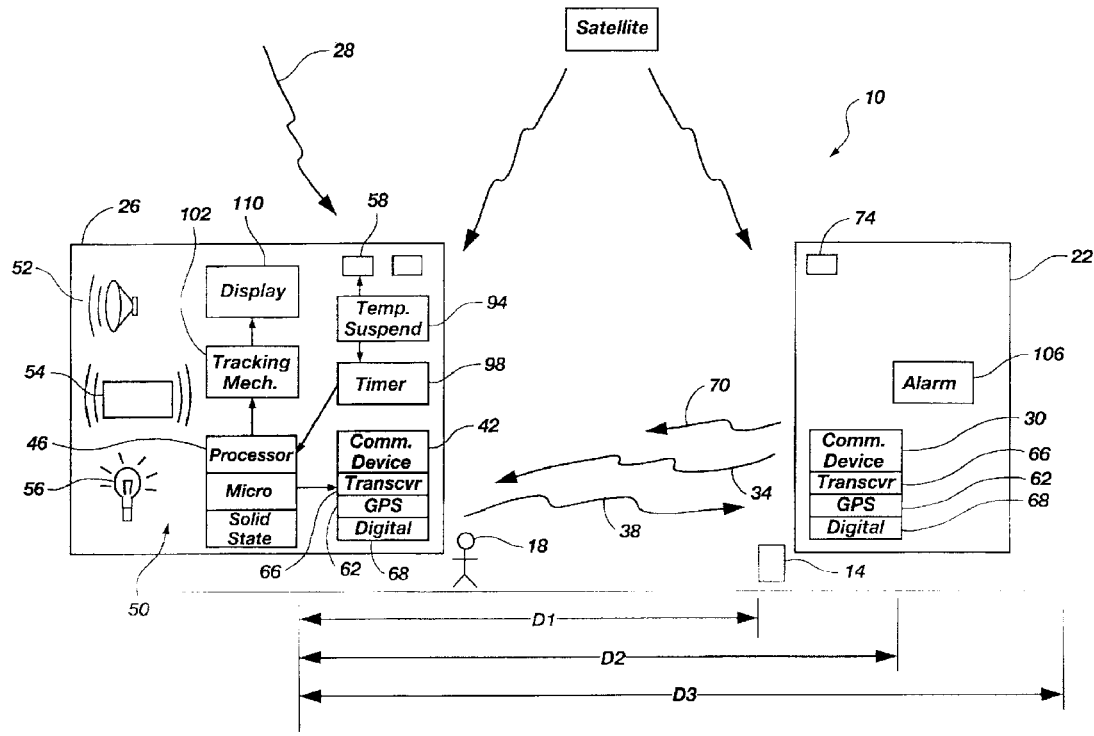

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 17 and 29 are cancelled.
Claims 1–16 and 18–28 were not reexamined.

* * * * *